United States Patent [19]

Lubalin et al.

[11] 3,985,274

[45] Oct. 12, 1976

[54] DISPENSER-COVER FOR CONTAINERS FILLED WITH GRANULAR OR POWDERED MATERIAL

[76] Inventors: Herbert Lubalin, 1024 W. Broadway, Woodmere, Long Island, N.Y. 11598; Reiner Lubge, 271 Warren St., Brooklyn, N.Y. 11201

[22] Filed: Aug. 2, 1973

[21] Appl. No.: 384,793

[52] U.S. Cl. .................................. 222/362; 222/456

[51] Int. Cl.$^{2}$ .......................................... G01F 11/26

[58] Field of Search ........... 222/454, 455, 456, 158, 222/164, 166, 362, 457.5, 500, 364; 221/288

[56] References Cited

UNITED STATES PATENTS

| | | | |
|---|---|---|---|
| 924,533 | 6/1909 | Compton et al. | 222/362 X |
| 928,022 | 7/1909 | Boland et al. | 222/362 X |
| 1,752,527 | 4/1930 | Howard | 222/364 |
| 1,967,448 | 7/1934 | Olson | 222/364 |
| 2,102,877 | 12/1937 | Barnett | 222/364 X |
| 2,205,129 | 6/1940 | Barnett | 222/364 |

*Primary Examiner*—Robert B. Reeves
*Assistant Examiner*—Francis J. Bartuska

[57] ABSTRACT

A dispenser-cover adapted to replace existing auxiliary caps on containers for granulated or powdered coffee or other material in particulate form, the cover serving to discharge a metered amount of such material. The cover is constituted by a cap attachable to the mouth of the container, the cylindrical side wall of the cap having an opening therein which receives a trough-like spout whose apex is pivoted to the side wall. Extending across the upper section of the spout is a divider that partitions the section into two zones, such that when the spout is swung open to expose the front zone and the container is tipped over, particulate material lying in the lower section of the spout whose capacity is equal to one teaspoon or any other predetermined measure, is discharged through the open zone, the divider blocking the discharge of additional material.

6 Claims, 12 Drawing Figures

Fig. 1.
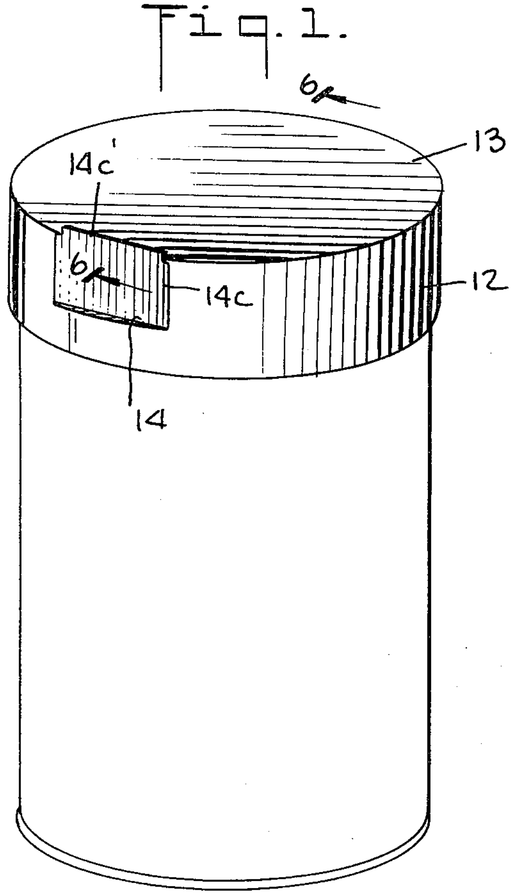
Fig. 2.
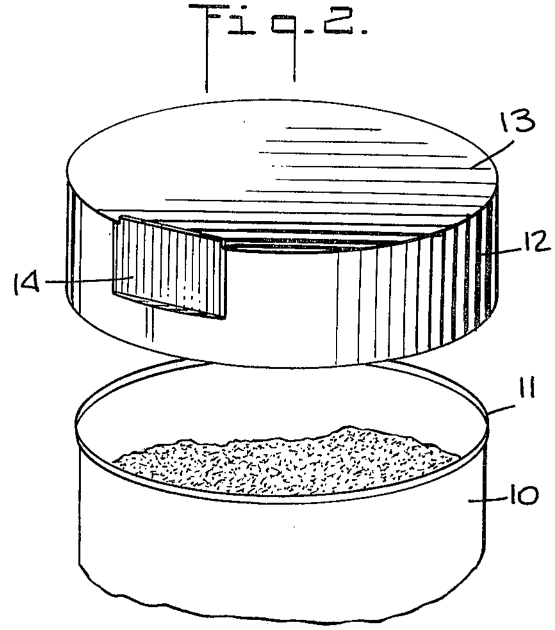
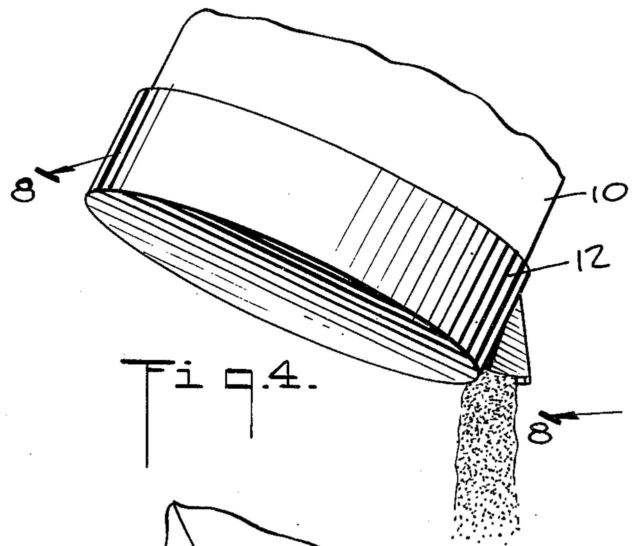
Fig. 4.
Fig. 3.
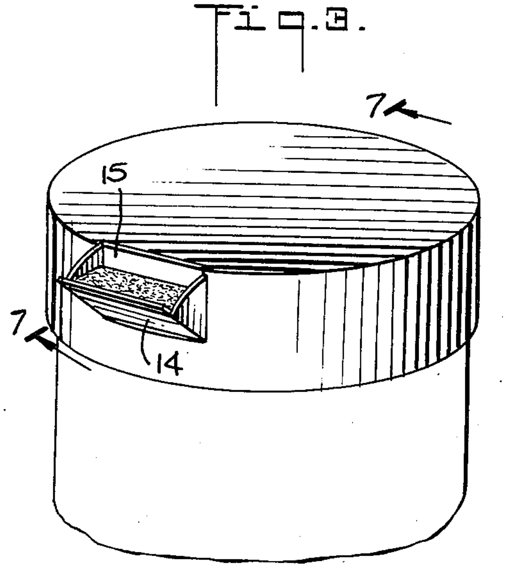
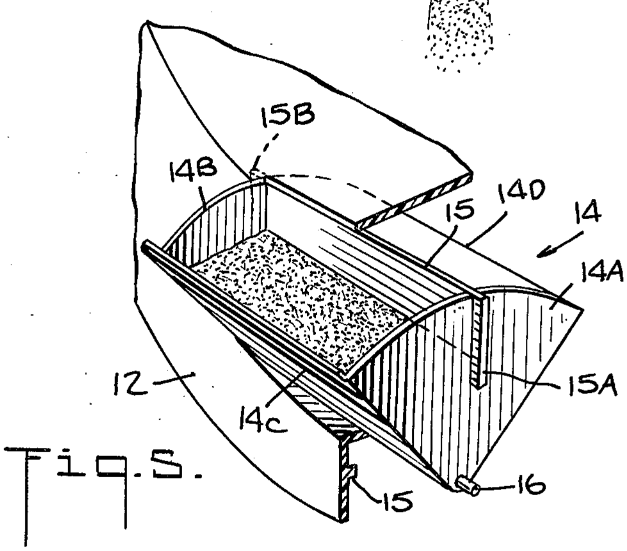
Fig. 5.

DISPENSER-COVER FOR CONTAINERS FILLED WITH GRANULAR OR POWDERED MATERIAL

BACKGROUND OF THE INVENTION

This invention relates generally to dispensers for particulate material, and more particularly to a dispenser-cover adapted to replace existing auxiliary container caps and incorporating a metering spout for discharging a predetermined amount of the material.

Ground coffee is presently sold in one or two pound vacuum-packed metal cans provided with a flexible or soft plastic auxiliary cap which is useable with the container after the sealed metal cap is removed. Since the amount of ground coffee necessary for a percolator or other brewing device is usually measured in teaspoons (one per cup of brewed coffee), the common practice is to include a plastic spoon in the container.

Thus each time the container is put to use, the auxiliary cap must be removed and ground coffee is then ladled out by means of the spoon. One disadvantage of this procedure is that if the spoon is filled to the brim to obtain a full measure, some of the grounds tend to spill in the course of handling, and if in order to avoid spillage, the spoon is only partially filled, then the measure is short.

A similar problem exists with powdered coffee or tea, for here too one must spoon out the powder from a container having a screw-on cover. Also, in recent years, other food products, such as orange juice substitutes, have become available in powdered or granulated form and one needs a spoon to measure out the amount of powder to be served.

SUMMARY OF THE INVENTION

In view of the foregoing, it is the main object of the invention to provide a dispenser-cover which is adapted to replace existing caps on containers for granulated or powdered material, and serving to discharge a metered amount of such material.

A significant advantage of the invention is that, once installed, the cover remains attached to the container, and there is no need for a spoon to ladle out a predetermined amount of the material, thereby avoiding spillage or short measures.

More specifically it is an object of the invention to provide an inexpensive and efficient dispenser-cover which includes a retractable metering spout which, in the open state, discharges a predetermined amount of particulate material when the container is tipped over.

Briefly stated, these objects are attained in a cover attachable to the mouth of a container having a threaded or beaded rim, the cylindrical side wall of the cover having an opening therein which receives a trough-like retractable spout whose apex is pivoted to the side wall. Extending across the upper section of the spout is a divider that partitions this section into two zones such that when the spout is swung open to expose the front zone, and the container is tipped over, particulate material lying in the lower section of the spout whose capacity is equal to a teaspoon or any other predetermined measure, is discharged through the open zone, the divider blocking the discharge of additional material.

OUTLINE OF THE DRAWING

For a better understanding of the invention as well as other objects and further features thereof, reference is made to the following detailed description to be read in conjunction with the accompanying drawing, wherein:

FIG. 1 is a perspective view of a first preferred embodiment of a dispenser-cover in accordance with the invention, the spout being shown in the closed state;

FIG. 2 shows the cover raised above the container;

FIG. 3 is the same as FIG. 1 except that the spout is shown in the open state;

FIG. 4 shows the dispenser-cover with its spout open to discharge granulated coffee when the container is tipped over;

FIG. 5 is an enlarged view showing the structure of the spout;

DESCRIPTION OF THE INVENTION

Figure 6:
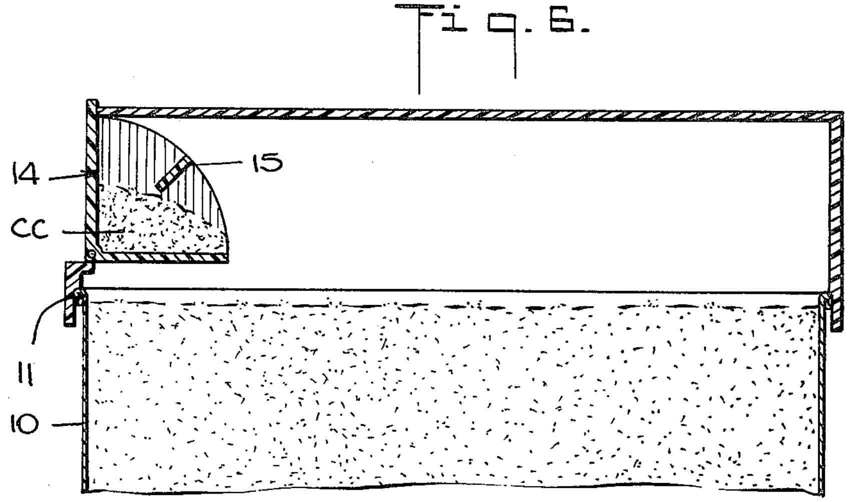
FIG. 6 is a longitudinal section taken through the cover and the container in the plane indicated by line 6—6 in FIG. 1.

Referring now to FIGS. 1 to 9, there is shown a dispenser-cover in accordance with the invention, the cover being adapted to replace the soft, plastic auxiliary cap normally supplied with a vacuum-packed can 10 of coffee. The mouth of the can is formed with a beaded rim 11.

The cover which is preferably made of a suitable synthetic flexible plastic material, such as a polypropylene or polyvinyl chloride, is constituted by a cap having a cylindrical side wall 12 and a disc-shaped top 13. Received within a rectangular opening in the side wall, is a trough-like metering spout, generally designated by numeral 14. The interior surface of the side wall is provided with a circular shoulder 15 adapted to rest on the rim 11 of the container whereby the cover is placed over the mouth.

The trough-like spout 14, as best seen in FIG. 5, is provided with a pair of sector-shaped ends 14A and 14B and rectangular sides 14C and 14D at right angles to each other to impart a V-shaped formation to the spout. The upper section of the spout is partitioned by a divider 15 into two 45° zones. The spout is pivoted on the side wall 12 by means of trunnions 16, projecting from the apex of the spout.

The opposite ends of divider 15 extend slightly beyond the ends 14A and 14B of the spout to provide limits 15A and 15B which abut the interior surface of the side wall 12 when the spout is swung out, whereby only the front zone of the upper section of the spout is then exposed as shown in FIG. 3. Manipulation of the spout is facilitated by a tab extension 14C′ on the front side 14C of the spout, the extension rising slightly above the top 13 of the cover and serving also to limit the retraction of the spout.

Figure 7:
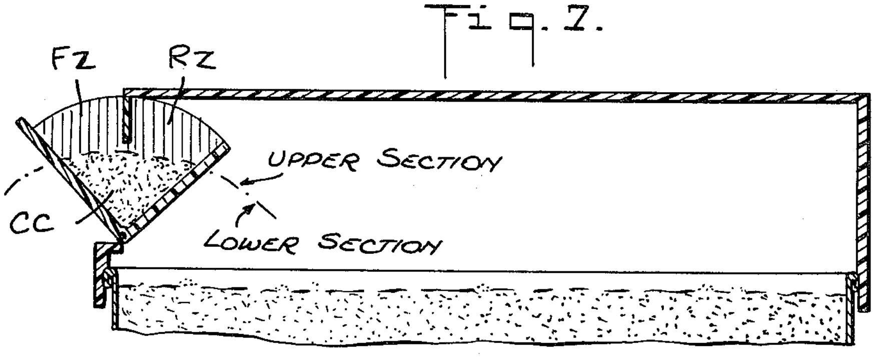
FIG. 7 is a longitudinal section taken in the plane indicated by line 7—7 in FIG. 1.

When the dispenser-cover is installed on an upright ground coffee container with its spout closed, and the container is turned over for the first time, the coffee will spill into the closed spout, and when the container is returned to its upright position, a charge CC of coffee grounds will remain in the spout as shown in FIG. 6. When the spout is then opened, the front zone FZ of the upper section will be exposed whereas the rear zone RZ will remain within the container, as shown in FIG. 7. The coffee grounds CC are now held within the lower, unpartitioned section of the spout.

Figure 8:
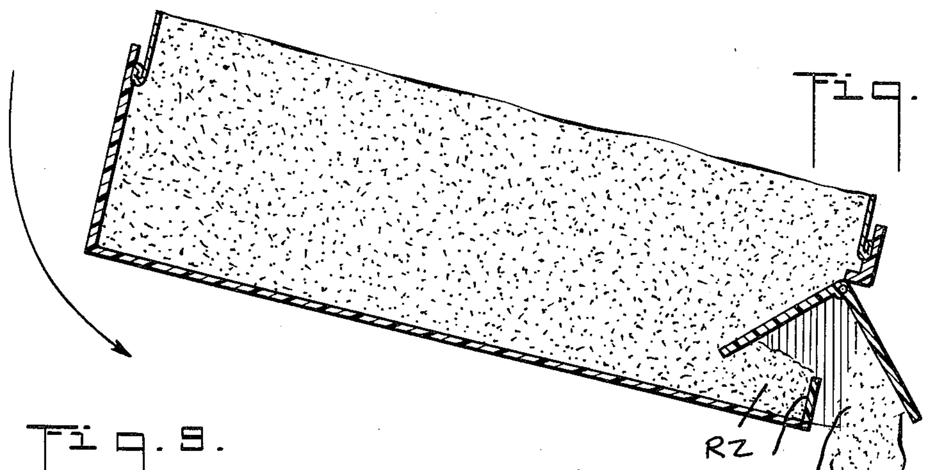
FIG. 8 is a longitudinal section taken in the plane indicated by line 8—8 in FIG. 4.
Figure 9:
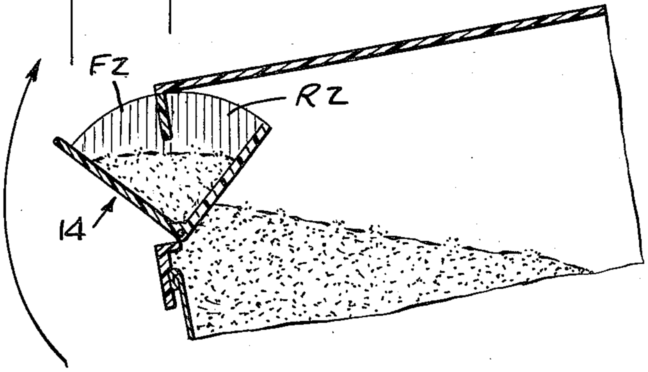
FIG. 9 is the same as FIG. 8, except that now the container has been returned to its normal, upright position.

If now, as shown in FIG. 8, the container is tipped over, the grounds in the lower section will discharge from the front zone FZ of the spout. Because the container is upside down, the coffee grounds therein seek to spill into the rear zone RZ, but they are blocked by divider 15 from discharging. When the container is returned to its upright position, as shown in FIG. 9, the grounds in the rear zone RZ then fall into the lower section of the spout, so that should one wish to dispense another charge of the grounds, the container is again turned over and the process is repeated.

In other words, each time the container is tipped over and a discharge is made from the front zone of the spout, a fresh charge is at the same time admitted into the rear zone. This fresh charge is transferred to the lower section of the spout when the container is returned to its upright position, in readiness for the next discharge. The spout dimensions are such as to hold the equivalent of one teaspoon of grounds in the lower section. Obviously, should the desired measure be one tablespoon or any other value, the spout may be dimensioned accordingly. When therefore, one wishes to dispense five teaspoons of ground coffee, the container is tipped over five times in succession.

Figure 10:
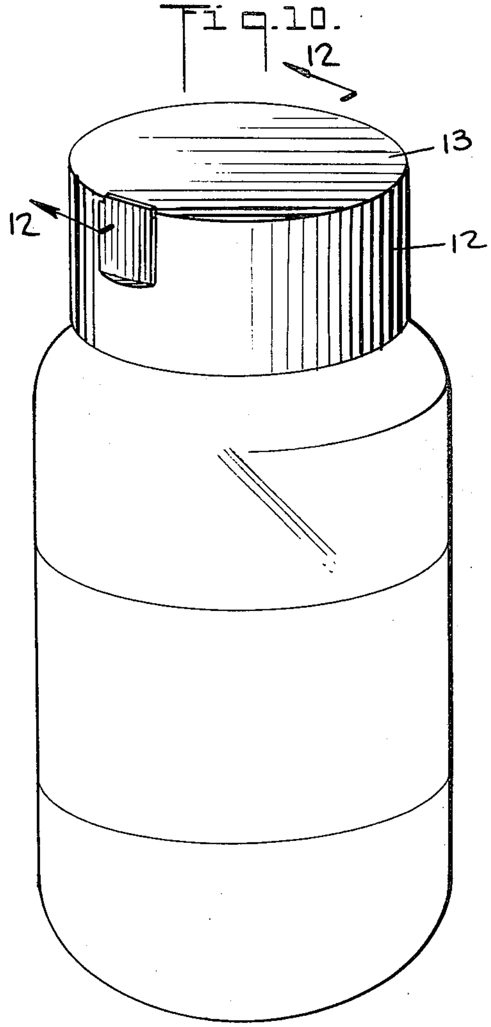
FIG. 10 is a perspective view of a second preferred embodiment of a dispenser-cover in accordance with the invention.
Figure 11:
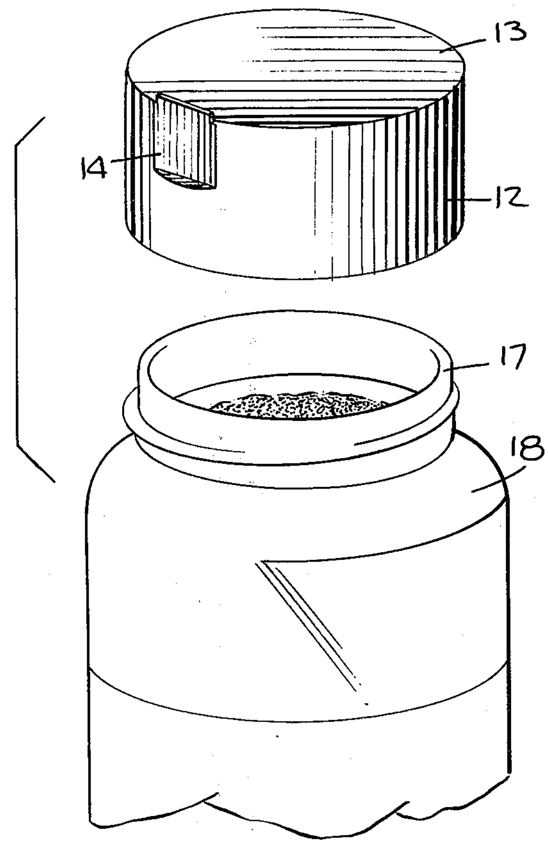
FIG. 11 is the same as FIG. 10 except that the cover is shown raised above the container.
Figure 12:
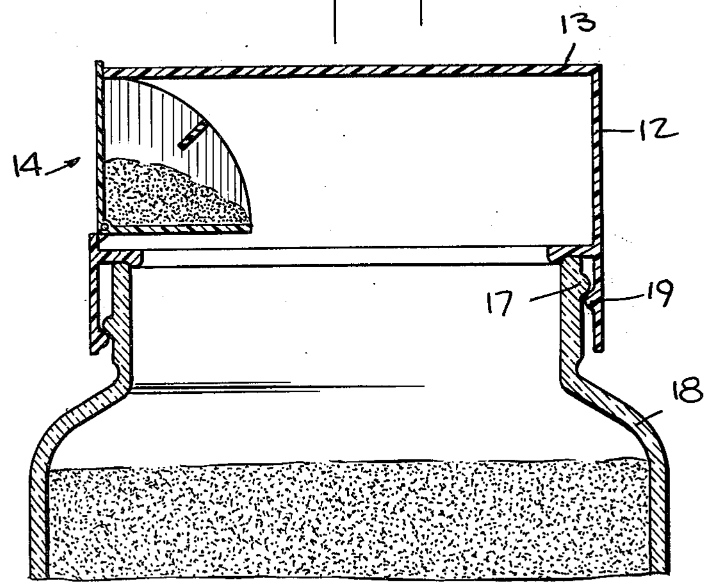
FIG. 12 is a longitudinal section taken through the cover and container in the plane indicated by line 12—12 in FIG. 10.

The embodiment illustrated in FIGS. 10 to 12 operates on the same principle as the embodiment shown in FIGS. 1 to 9, the only difference being that the dispenser-cover is adapted to screw-on to the threaded rim 17 of a bottle 18 of the type used to contain powdered coffee or tea, or other food products in particulate form. For this purpose, the interior of the cylindrical side wall 12 is provided with matching threads 19.

While there has been shown preferred embodiments of the invention it will be appreciated that many changes may be made therein without departing from the spirit of the invention.

We claim:

1. A dispenser-cover unit for a container filled with particulate material, such as ground or powdered coffee, the unit being adapted to discharge a metered amount of said material each time it is tipped over; said unit comprising:

A. a cap having a top wall and a cylindrical side wall dimensioned to engage the rim of the container, said side wall having a generally rectangular opening therein whose upper edge is defined by said top wall, and B. a trough-shaped spout received in said opening and having sector-shaped end walls, the apex of said spout extending along the lower edge of said opening and being pivoted on said side wall, and C. a divider extending across said spout between said end walls to partition the upper section thereof into a front zone and a rear zone and to define therebelow a free lower section, said spout being swingable from an open position in which the upper edge of said divider abuts said top wall of the cap and said front zone is exposed while said rear zone lies within said container whereby a charge of particulate matter held in the lower section of the spout is discharged from said front zone and a fresh charge of particulate material spills into said rear zone when the container is tipped over, to a closed position in which both zones lie within said container, the ends of said divider projecting beyond said end walls to provide limits to restrict the swing of the spout.

2. A unit as set forth in claim 1, wherein said cap is fabricated of plastic material and includes a shoulder which engages a beaded rim on the mouth of the container;

3. A unit as set forth in claim 1, wherein said cap has an internally threaded surface to engage the externally threaded mouth of a container.

4. A unit as set forth in claim 1, wherein the capacity of said lower section is equivalent to a teaspoon.

5. A unit as set forth in claim 1, wherein the capacity of said lower section is equivalent to a tablespoon.

6. A unit as set forth in claim 1, wherein said spout is formed with rectangular side walls attached to said end walls, the front side wall having a tab extension which is elevated slightly above the top wall of the cap to facilitate manipulation of the spout.

* * * * *